United States Patent
Shikata et al.

[15] 3,671,466
[45] June 20, 1972

[54] PROCESS FOR POLYMERIZING THREE-MEMBERED HETEROCYCLIC COMPOUNDS

[72] Inventors: Kazuo Shikata, Tokuyama; Suekiti Nakao, Tsuno-gun; Katsutoshi Knoml, Tokuyama, all of Japan

[73] Assignee: Tokuyama Soda Kabushiki Kaisha, Tokuyama-shi, Japan

[22] Filed: July 7, 1970

[21] Appl. No.: 52,887

[30] Foreign Application Priority Data

July 7, 1969   Japan..................................44/53100

[52] U.S. Cl. .................260/2 A, 252/431 N, 252/431 R, 260/79, 260/88.3 A, 260/486 B, 260/615 B
[51] Int. Cl. .............................................C08g 23/14
[58] Field of Search..............260/2 A, 79, 615 B, 88.3 A, 260/486 B

[56] References Cited

UNITED STATES PATENTS

| | | |
|---|---|---|
| 3,345,308 | 10/1967 | Lal..........................260/2 |
| 3,459,721 | 8/1969 | Kuntz et al...................260/88.3 |
| 3,509,068 | 4/1970 | Lal..........................252/431 |
| 3,542,698 | 11/1970 | Lal..........................260/2 |

Primary Examiner—William H. Short
Assistant Examiner—E. Nielsen
Attorney—Sherman and Shalloway

[57] ABSTRACT

Process for polymerizing three-membered heterocyclic compounds such as propylene oxide, using a new binary catalyst, i.e., a combination catalyst of two metallic components: a heavy metal organic compound of either nickel or cobalt and an organic compound of zinc.

8 Claims, 3 Drawing Figures

PROCESS FOR POLYMERIZING THREE-MEMBERED HETEROCYCLIC COMPOUNDS

This invention relates to a catalyst suitable for use in the polymerization of oxirane or thiirane compounds, to a process for the polymerization of such compounds, and to the polymers so produced.

Organozinc compounds have been used with either water or alcohol as catalysts for polymerizing oxirane or thiirane compounds. In addition, organometallic compounds of zinc, cadmium, magnesium, aluminum or iron and coordination complexes or organozinc or organomagnesium compounds with compounds containing sulphur have also been suggested for use.

However, the polymerization activity of these catalysts is either low or falls off as the polymerization reaction proceeds.

The invention provides catalysts which are highly active and durable and which comprise (a) a compound of the formula

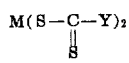

wherein M represents nickel or cobalt and Y represents the group

or $-OR^2$ in which $R^2$ and $R^3$, which may be the same or different, each represent a monovalent hydrocarbon group of up to eight carbon atoms, and (b) an organozinc compound in which at least one carbon atom is attached directly to a zinc atom.

In the formula for the nickel or cobalt compound (a) the groups $R^2$ and $R^3$ may be alkyl groups, preferably of one to four carbon atoms, such as methyl, ethyl, n-, or iso-propyl groups, or n-, iso-, sec.- or tert.- butyl groups; or aryl, alkaryl or aralkyl groups such as of six to eight carbon atoms such a phenyl, tolyl, benzyl or phenethyl.

Suitable nickel or cobalt compounds include, for example, dialkyl dithiocarbamates, such as dimethyl dithiocarbamates, diethyl dithiocarbamates, diisopropyl dithiocarbamates or dibutyl dithiocarbamates, of nickel or cobalt; aromatic dithiocarbamates, such as the diphenyl dithiocarbamate, of nickel or cobalt; alkylxanthates, such as methylxanthates, ethylxanthates, propylxanthates or butylxanthates, or nickel or cobalt; and aromatic xanthates, such as phenylxanthates and alkylarylxanthates, of nickel or cobalt.

Preferred organozinc compounds are of the formula $R^4ZnX$, wherein $R^4$ is an alkyl group of one to four carbon atoms and X is a hydrogen or halogen atom, or an alkyl or alkoxy group of one to four carbon atoms.

Suitable organozinc compounds include dialkyl zincs, such as dimethyl zinc, diethyl zinc, dipropyl zinc and dibutyl zinc; alkyl zinc halides, such as methyl zinc chloride, ethyl zinc chloride, ethyl zinc bromide, ethyl zinc iodide, propyl zinc chloride, propyl zinc bromide, propyl zinc iodide, butyl zinc chloride, butyl zinc bromide and butyl zinc iodide; zinc alkoxides such as methyl zinc methoxide, ethyl zinc ethoxide, propyl zinc propoxide, butyl zinc butoxide and butyl zinc ethoxide; and alkyl zinc hydrides, such as ethyl zinc hydride and butyl zinc hydride.

Other organozinc compounds which may be used are aromatic hydrocarbyl zincs, such as diphenyl zinc, or aromatic hydrocarbyl zinc halides.

Catalysts which have been found to have especially high activity are: (1) the combination of a nickel dialkyl dithiocarbamate and a dialkyl zinc, for example the combination of nickel dimethyl dithiocarbamate with diethyl zinc, and of nickel dibutyl dithiocarbamate with diethyl zinc; and (2) the combination of a nickel alkylxanthate and a dialkyl zinc, for example the combination of nickel isopropylxanthate with diethyl zinc, and of nickel butylxanthate with diethyl zinc.

The molar ratio of the nickel or cobalt compound (a) to the organo zinc compound in the catalysts of the invention can be varied over a broad range but for good polymerization activity the molar ratio of compound (a) to the organo zinc compound is preferably from 0.1:1 to 10:1, especially 0.3:1 to 1.5:1.

The catalysts of the invention may be prepared by any suitable method and mere mixing of the two components will suffice. Preferably the components are dissolved or dispersed in a liquid hydrocarbon or ether. Aromatic hydrocarbon solvents, such as benzene, are especially suitable since both components readily dissolve therein. The components of the catalyst may be brought together at a temperature of from −50° to 140° C., preferably from room temperature to 130° C., and particularly from 80° to 120° C.

The catalysts of the invention are suitable for use in the polymerization of oxiranes and thiiranes and are highly active and durable. The oxiranes and thiiranes are polymerized by a ring-opening by contacting them with a catalyst of the invention. The oxiranes and thiiranes may be represented by the formula

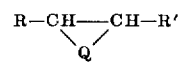

wherein R represents a hydrogen atom or an alkyl group of one to eight carbon atoms, R' represents a hydrogen atom, a hydrocarbon group of up to eight carbon atoms, an alkenyloxymethyl group or an alkenylcarbonyloxymethyl group, or R and R' together represent an alkylene or alkenylene group, and Q represents an oxygen or sulphur atom. Examples of hydrocarbon groups represented by R' are alkyl groups such as methyl, ethyl and propyl; aryl and alkaryl groups such as phenyl and tolyl; or alkenyl groups such as vinyl and allyl. When R' represents an alkenyloxy ethyl group it may be, for example, allyloxymethyl and when it represents an alkenylcarbonyloxymethyl group it may be acryloxymethyl or methacryloxymethyl.

Suitable examples of the three-membered ring heterocyclic compounds are olefin oxides, such as ethylene oxide, propylene oxide, butylene oxide, styrene oxide and cyclohexene oxide; epoxy compounds, such as butadiene monoxide, allylglycidyl ether, glycidyl acrylate and glycidyl methacrylate; olefin sulphides, such as ethylene sulphide, propylene sulphide, butylene sulphide and styrene sulphide; and thiirane compounds such as butadiene monosulphide. These monomers may be either homopolymerized or copolymerized in various combinations.

The amount of the catalyst, which is to be used is a catalytic amount which varies depending upon the particular catalyst components which are used and upon the degree of polymerization of the intended polymer. In general an amount of from 0.01 to 20 parts, and preferably 0.05 to 10 parts, per 100 parts of the monomer is suitable.

The catalyst of the invention is relatively stable and its activity does not decline even when allowed to stand for a long period of time after its preparation. It is also very stable to water so that even if a small quantity, say about 0.8 mol, based on the organozinc compound (reducing component), of water or alcohol is present, practically no decline in activity takes place. However, the polymerization reaction is preferably carried out in the absence of water or alcohol.

The polymerization reaction may be carried out in any suitable manner in accordance with known polymerization techniques. For example, the polymerization reaction can be carried out by introducing the catalyst into an autoclave which has been purged with an inert gas, introducing the monomer to be polymerized in the presence of a solvent, such as an ether or a hydrocarbon, or introducing the monomer to be polymerized in the presence of a solvent, such as ether or a hydrocarbon, or introducing the monomer alone without using any solvent at all, and polymerizing the monomer at a temperature of from −50° to 150° C. In general, the higher the polymerization reaction temperature, the faster the polymerization, but the intrinsic viscosity of the resulting polymer tends to fall with increasing temperature. Hence a temperature of from room temperature to about 100° C. is preferred. The polymerization can be carried out either continuously or batchwise.

The polymers obtained in accordance with the invention consist essentially of repeating units of the formula

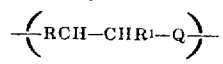

or

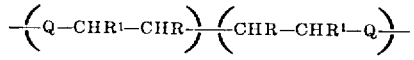

wherein R, R¹ and Q are as hereinbefore defined. The molecular weight of the polymer will vary greatly depending upon the monomer or monomers used and can be adjusted to suit the use to which the intended polymer is to be put. For example, ethylene oxide polymers are generally used as intermediates for surfactants, as anti-freeze liquids or as textile treatment agents, while propylene oxide polymers can provide rubbery substances. Copolymers of propylene oxide and an epoxy compound having a vinyl group, for example allylglycidyl ether, can yield excellent vulcanizable rubbers. Block copolymers of ethylene oxide and propylene oxide provide neutral surfactants. Copolymers of styrene oxide and ethylene sulphide provide resinous substances. Polymers of ethylene sulphide or propylene sulphide are high-melting, fiber-forming resins of outstanding transparency, which can readily be blended with polyolefins.

The polymers obtained in accordance with the invention can be recovered by any suitable known method. The polymers have good stability in air, better, for example, than that of polyalkylene oxides or polyalkylene sulphides polymerized using diethyl zinc and water as catalyst. In consequence, the polymers can be stored over a prolonged period of time without the addition of stabilizers. The reason for this stability is not fully understood but may be attributable to the presence of catalyst residues in the polymer. The most stable polymers are those obtained when using catalysts comprising the xanthates of nickel or cobalt, for example a catalyst composed of nickel isopropylxanthate and diethyl zinc.

The invention will be described in more detail by reference to the accompanying drawings, in which.

Figure 1:
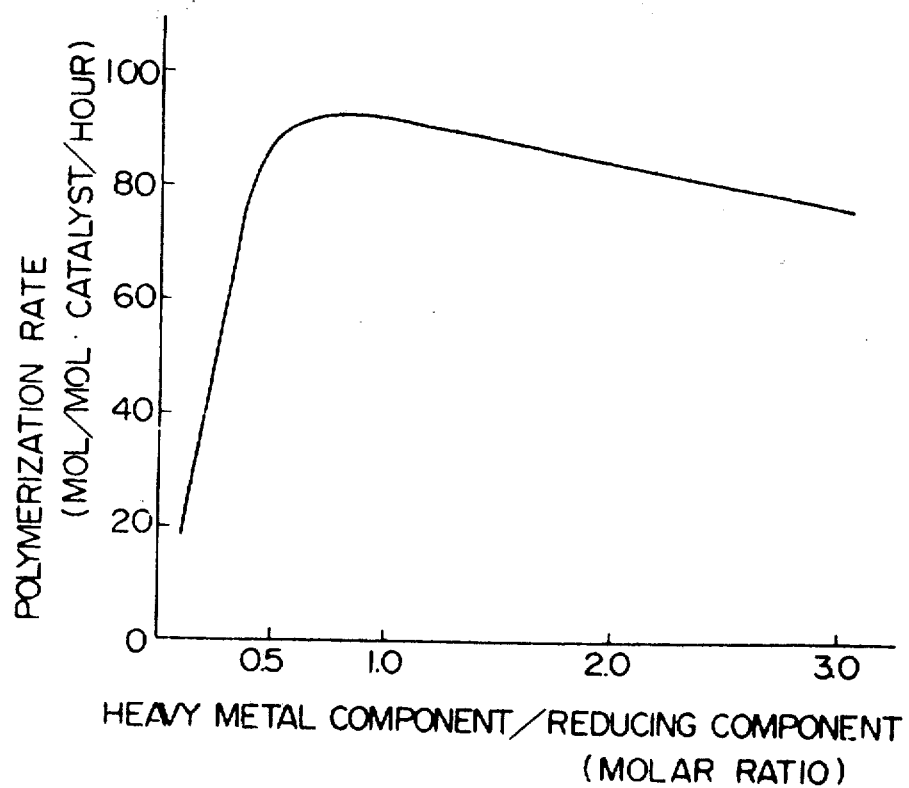
FIG. 1 is a graph illustrating the relationship between the composition of a catalyst and its polymerization activity.

Referring to FIG. 1, the relationship between the molar composition of a catalyst and its effect on the polymerization rate is shown for the case where a mixture of 94 percent by weight of propylene oxide and 6 percent by weight of allylglycidyl ether was polymerized in the presence of a catalyst comprising nickel dibutyl dithiocarbamate (heavy metal component) and diethyl zinc (reducing component). It can be seen from FIG. 1 that the molar ratio of the heavy metal component to the reducing component should preferably be from 0.3:1 to 1.5:1.

Figure 2:
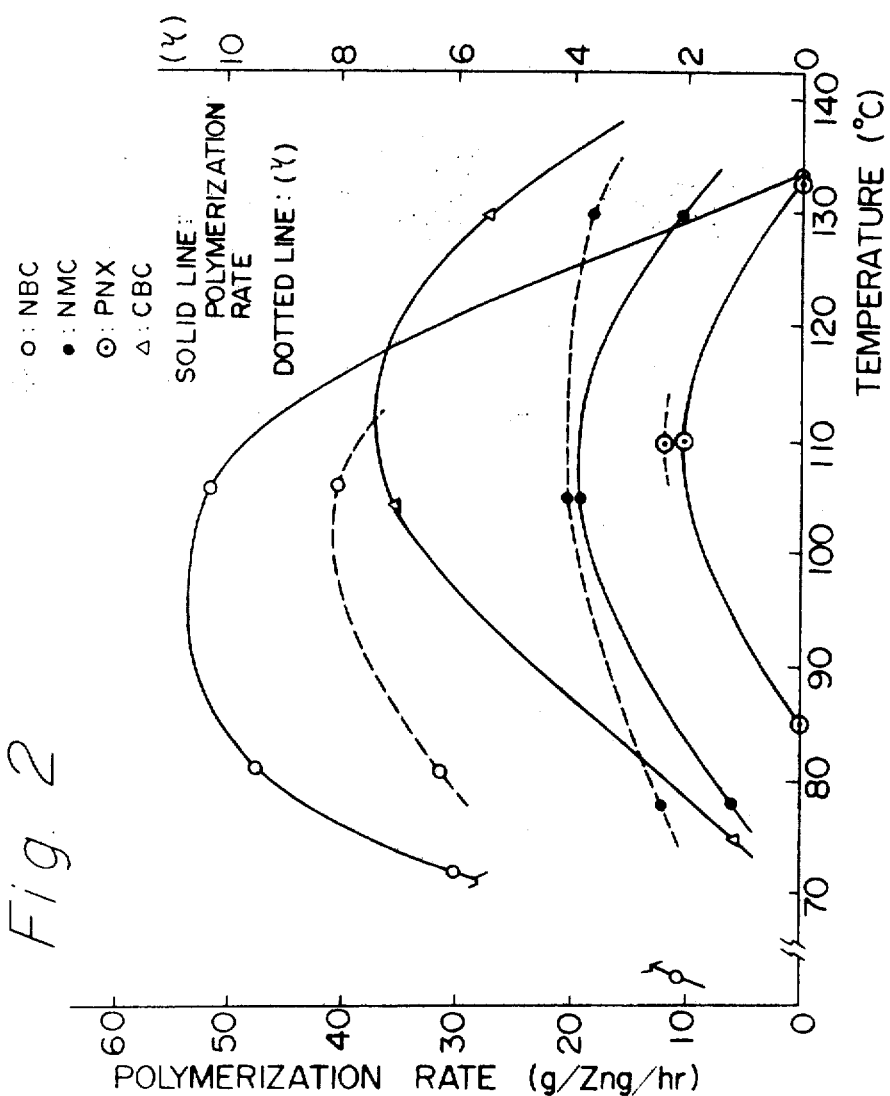
FIG. 2 is a graph illustrating the relationship between the temperature at which a catalyst was prepared and its polymerization activity.

In FIG. 2 are shown the polymerization rates (gram polymer/gram catalyst-hour) when a mixture of 94 percent by weight of propylene oxide and 6 percent by weight of allylglycidyl ether was polymerized, using catalysts prepared at different temperatures and comprising, as the heavy metal components, nickel dibutyl dithiocarbamate (NBC), nickel dimethyl dithiocarbamate (NMC), nickel diisopropylxanthate (PNX) or cobalt dibutyl dithiocarbamate (CBC), respectively, and, as the reducing component, diethyl zinc in a molar ratio of heavy metal component/$ZnEt_2$ of 0.5. The intrinsic viscosities of the resulting polymers are also shown in FIG. 2.

Figure 3:
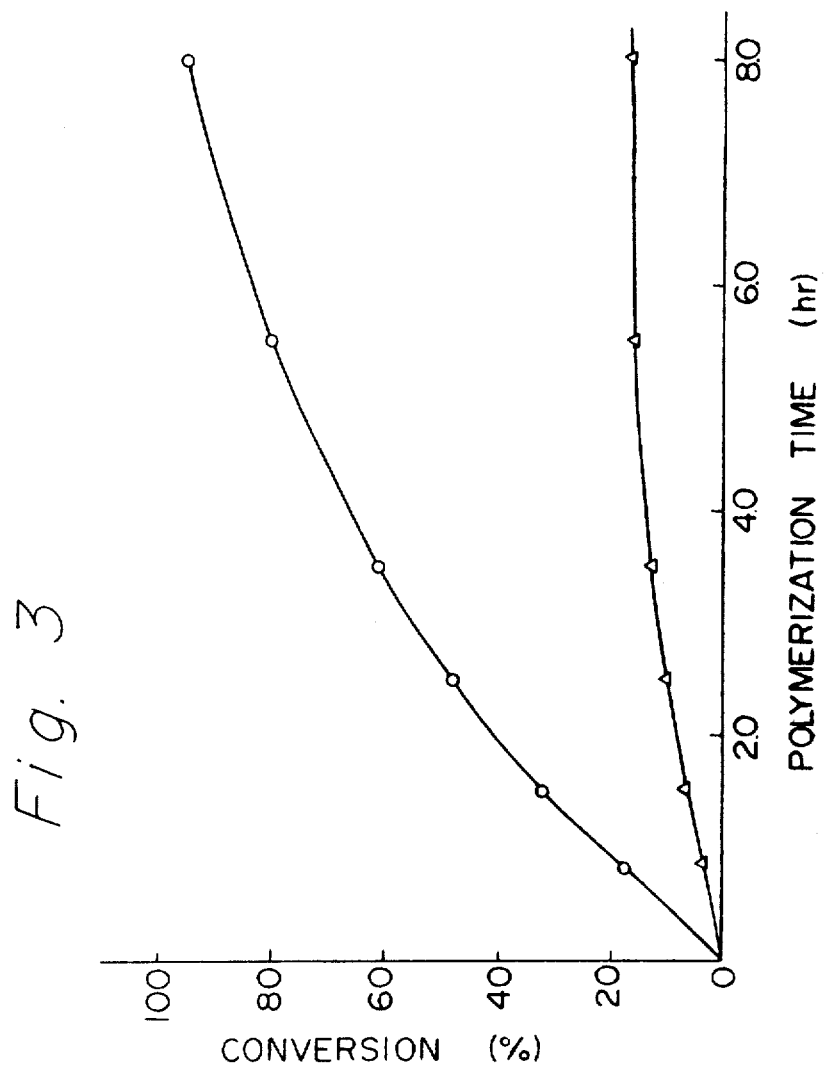
FIG. 3 is a graph illustrating the relationship between the duration of the polymerization reaction and monomer conversion, a comparison being made between the use of a catalyst of the invention and the use of a conventional catalyst.

In addition to their excellent polymerization activity, the catalysts of the invention are long acting. This is illustrated in FIG. 3 which shows the changes that take place in the yield of the polymerization reaction with the passage of time when a conventional catalyst and a catalyst of the invention were used in carrying out polymerization reactions in accordance with the conditions indicated in Table 1 below. It is apparent from these results that the catalyst of the invention is superior to the conventional catalyst with respect to its polymerization durability.

TABLE 1

| Catalyst | Catalyst preparation conditions | | | | | | Polymerisation conditions | | | |
|---|---|---|---|---|---|---|---|---|---|---|
| | $ZnEt_2$ (g.) | NBC (g.) | $H_2O$ (g.) | Solvent (ml.) | Temp. (° C.) | Time (min.) | Monomer (g.) | AGE¹ (g.) | Solvent (ml.) | Temp. (° C.) |
| Conventional | 0.5 | | 0.06 | PO² 50 | 5 | 30 | PO² 166 | 10.7 | C⁶H⁶ 1,130 | 100 |
| Invention | 0.264 | 1.88 | | C⁶H⁶ | 6-9 | 10 | PO² 166 | 10.7 | C⁶H⁶ 1,130 | 100 |

¹ AGE=allyl glycidyl ether.   ² PO=propylene oxide.

The following examples serve to illustrate the invention.

EXAMPLE I

A three-necked 100-ml flask equipped with a magnetic stirrer was purged with argon, and a solvent and then nickel dibutyl dithiocarbamate (NBC) was added to the flask in the amounts indicated in Table 2 while cooling the flask with an ice-water bath. A diethyl zinc solution diluted with benzene was then added. The color of the contents turned from greenish brown to blackish brown and at the same time the temperature rose. This solution was then reacted for the times and at the temperatures indicated in Table 2 to prepare the catalyst.

TABLE 2

| Run | Catalyst preparation conditions | | | | | Polymerization conditions | | | | | Results | |
|---|---|---|---|---|---|---|---|---|---|---|---|---|
| | $ZnEt_2$ (m-mol) | NBC/$ZnEt_2$ (mol ratio) | Solvent (cc.) | Temperature (° C.) | Time (min.) | PO+AGE/$ZnEt_2$ (g./g.) | Benzene (cc.) | Temperature (° C.) | Time (hr.) | Yield POR (g.)/$ZnEt_2$ (g.) | [η] |
| 1 | 7.50 | 0.5 | PO 35 | 2-9 | 10 | 191 | 1,130 | 100 | 3.5 | 173.0 | 5.4 |
| 2 | 7.50 | 0.2 | PO 35 | 2-8 | 10 | 191 | 1,130 | 100 | 3.5 | 83.3 | 4.2 |
| 3 | 4.28 | 1.0 | PO 40 | 3-6 | 10 | 335 | 1,130 | 100 | 3.5 | 211.0 | 5.3 |
| 4 | 2.14 | 2.0 | PO 40 | 2-3 | 10 | 670 | 1,130 | 100 | 3.5 | 231.0 | 5.7 |
| 5 | 4.28 | 3.0 | PO 50 | 3-7 | 10 | 335 | 1,130 | 100 | 3.5 | 200.0 | 5.5 |
| 6 | 4.28 | 0.5 | $C_6H_6$ 20 | 8-10 | 10 | 335 | 1,130 | 100 | 3.5 | 194.0 | 6.5 |
| 7 | 10.70 | 0.5 | 50 | 2-12 | 10 | 134 | 1,130 | 55 | 6.0 | 79.9 | 6.7 |
| 8 | 3.21 | 1.0 | 50 | 4-6 | 30 | 731 | | 50-60 | 2.4 | 897.5 | 2.0 |
| 9 | 3.21 | 0.5 | Ethyl ether 50 | 4-6 | 30 | 731 | | 50-60 | 2.4 | 453.0 | 4.2 |
| 10 | 3.21 | 0.5 | $C_6H_6$ 50 | 4-6 | 30 | 731 | | 50-60 | 2.4 | 646.8 | 9.6 |
| 11 | 7.50 | | PO 35 | 5 | 30 | 191 | 1,130 | 100 | 3.5 | 57.8 | 7.8 |

A stainless steel 2-liter autoclave equipped with a magnetic agitator was thoroughly purged with argon and charged with 1,130 ml of benzene, and a mixture of 94 percent by weight of propylene oxide (PO) and 6 percent by weight of allylglycidyl ether (AGE). The catalyst prepared as described above was added and a polymerization reaction was carried out at the temperature and for the time indicated in Table 2. A large quantity of methanol was added to the autoclave to terminate the reaction and, after stirring for several minutes, steam distillation of the contents was carried out, followed by vacuum drying for 24 hours at 70° C. The results obtained are shown in Table 2. In the table the abbreviation POR denotes the PO/AGE copolymer. Unless otherwise specified, the intrinsic viscosity [η] was measured in a benzene solution at 35° C., using Ubbelohde's viscometer. Runs 8 - 10 are the results of a standing polymerization reaction without the use of a solvent. Run 11 is a comparison in which 5.85 m-mol of water were used as a catalyst component instead of NBC.

EXAMPLE II

Catalysts were prepared at 5° C. ± 1° C. for 10 minutes with the apparatus of Example I using diethyl zinc and various heavy metal components or water as indicated in Table 3. The catalysts obtained were used in the polymerization of 166 grams of propylene oxide and 10.7 grams of AGE over the time indicated in Table 3 of 55° ± 5° C. by means of the non-solvent standing technique. The results are shown in Table 3.

TABLE 3

| Run | Heavy metal component or H₂O | Molar ratio based on ZnEt₂ | Polymerisation time (hr.) | POR/ZnEt₂ (g./g.) | [η] |
|---|---|---|---|---|---|
| 1 | H₂O | 0.78 | 24 | 81.3 | 7.8 |
| 2 | [(C₂H₅)₂N—CSS]₂Zn | 0.50 | 24 | 12.3 | |
| 3 | [(C₄H₉)₂N—CSS]₂Za | 0.50 | 20 | 10.0 | |
| 4 | [(CH₃)₂N—CSS]₂Cu | 0.50 | 20 | 5.8 | |
| 5 | [(CH₃)₂N—CSS]₃Bi | 0.34 | 20 | 0 | |
| 6 | [(CH₃)₂N—CSS]₃Fe | 0.34 | 14 | Trace | |
| 7 | [(C₂H₅)₂N—CSS]₄Se | 0.25 | 20 | 0 | |
| 8 | (CH₃)₂CHO—CSS—Na | 1.00 | 20 | Trace | |
| 9 | [(CH₃)₂N—CSS]₂Ni | 0.50 | 24 | 245.0 | 4.7 |
| 10 | [i-C₃H₇O—CSS]₂Ni | 0.50 | 24 | 201.0 | 4.2 |
| 11 | (CH₃COCH₂COC₂H₂)Ni | 0.50 | 20 | 0 | |

It is apparent from this example that the nickel dithiocarbamate of Run 9 and xanthate of Run 10 provide excellent results. As can be seen from Run 11 other nickel compounds are not effective.

EXAMPLE III

Catalysts were prepared with the same apparatus as used in Example I using as the solvent benzene (BZ) or heptane (Hept). This example was also conducted with the intent of investigating the catalytic activity when the heavy metal component was varied. The experiments were operated as in Example II, using the heavy metal components and monomers to be polymerized indicated in Table 4 in which the following abbreviations are used: PZ for zinc dimethyl dithiocarbamate, NMC for nickel dimethyl dithiocarbamate, NiAcet for nickel acetate, CBC for cobalt dibutyl dithiocarbamate, CMC for cobalt dimethyl dithiocarbamate, EO for ethylene oxide, StO for styrene oxide, ES for ethylene sulphide and PS for propylene sulphide.

The intrinsic viscosity [η] of ethylene oxide was measured in water. It can be seen from the results presented in Table 4 that the catalysts of this invention are effective.

EXAMPLE IV

Experiments were conducted with the same apparatus as used in Example I, varying the organozinc reducing component, with the results shown in Table 5. Synthesis of the catalysts was carried out in 50 ml of benzene. The abbreviation NPX stands for nickel isopropylxanthate.

TABLE 6

| | Preparation of catalyst | | | | | Polymerization | | | | Result | |
|---|---|---|---|---|---|---|---|---|---|---|---|
| | Heavy metal component | Zinc component | | | | | | | | | |
| Run | M-mol | | M-mol | Temp. (°C.) | Time (min.) | Monomer (g.) | Solvent (cc.) | Temp. (°C.) | Time (hr.) | Yield (g./Zn g.) | [η] |
| 1 | NBC 0.5 | Zn(C₂H₅)₂ | 0.5 | 50±1 | 30 | PO 79.6 | BZ 250 | 56 | 3 | 124 | 4.1 |
| 2 | NPX 0.5 | Zn(C₄H₉)₂ | 0.5 | 50±1 | 30 | PO 79.6 | BZ 250 | 56 | 3 | 92.3 | 4.1 |
| 3 | NBC 0.5 | Zn(C₃H₇)₂ | 0.5 | 50±1 | 30 | PO 79.6 | BZ 250 | 56 | 3 | 136 | 4.2 |

EXAMPLE V

The POR (AGE 6 wt. percent of charge) obtained by polymerizing with the ZnEt₂-NBC (NBC/ZnEt₂ mol ratio 0.5) catalyst system of Run 8 of Example I was left standing in air at 25° – 30° C. Its stability was then determined by measuring its intrinsic viscosity [η].

By way of comparison, the stability of POR obtained by polymerizing PO-AGE (AGE 6 wt. percent of charge) under identical conditions as in Run 8 of Example I but using a ZnEt₂-H₂O (H₂O/ZnEt₂ mol ratio 0.78) catalyst system prepared as in Run 8 of Example I was also determined. The POR specimens were cut into small pieces 2 × 2 × 2 mm and placed in open specimen bottles where they were allowed to stand. After the number of days given in Table 6 had elapsed, the intrinsic viscosity [η] was determined with a viscometer with the results shown in Table 6.

TABLE 6.—STABILITY OF POR

| | (η) Number of days elapsed | | | |
|---|---|---|---|---|
| Catalyst system | Original specimen | (η) After 7 days | (η) After 14 days | (η) After 44 days |
| ZnEt₂-H₂O | 7.8 | 3.1 | 2.3 | 0.6 |
| ZnEt₂-NBC | 6.5 | 6.0 | 5.7 | 4.7 |

EXAMPLE VI

Employing the same apparatus as used in Example I, catalysts were prepared by adding the catalyst components indicated in Table 7 to 40 cc of toluene. The organozinc compound was added in an amount of 3.0 millimoles and the M[SC(S)Y]compound in an amount of 1.5 millimoles, and the components were reacted for 30 minutes at 100°±3° C. A polymerization reaction was conducted with the catalysts obtained for 4 hours at 50° C. employing the polymerization apparatus of Example I and using as solvent 530 ml of toluene. The results obtained are shown in Table 7. The abbreviation NEC stands for nickel diethyl dithiocarbamate, NPC for nickel dipropyl dithiocarbamate, CEC for cobalt diethyl dithiocarbamate, NBC for nickel dibutyl dithiocarbamate, NMX for nickel methylxanthate, NEX for nickel ethylxanthate, NBX for nickel butylxanthate, CMX for cobalt butylxanthate, CPX for cobalt isopropylxanthate and CBX for cobalt butylxanthate.

EXAMPLE VII

Glass ampoules of about 30-ml capacity were purged with argon and charged with 20 ml of toluene, 1.5 millimoles of an organozinc compound and 0.75 millimole of a M[SC(S)Y]₂ compound and as monomer, 9.5 grams of propylene sulphide (PS). The contents were allowed to stand for 20 hours at room temperature to accomplish the polymerization. The several catalyst components and the results obtained by their use are shown in Table 8.

TABLE 8

| | Catalyst preparation conditions | | Results: Yield | |
|---|---|---|---|---|
| Run | Zinc compound | M(SCY)₂ S | G. | Percent |
| 1 | Zn(C₄H₉)₂ | CBC | 8.5 | 89.5 |
| 2 | Zn(C₄H₉)₂ | NPX | 5.0 | 52.7 |
| 3 | Zn(C₂H₅)₂ | CPX | 3.2 | 33.7 |

EXAMPLE VIII

Example VI was repeated except that the organozinc compound was used in an amount of 0.3 millimoles and the M(SC(S)Y)₂ compound in an amount of 1.5 millimoles and the reaction was carried out for 30 minutes at 70° – 80° C. to obtain the catalysts, which were then used in carrying out the polymerization of 97 grams of propylene oxide at 70° C. The abbreviation NMC stands for nickel dimethyl dithiocarbamate, CPC for cobalt diisopropyl dithiocarbamate and CEX for cobalt ethylxanthate. The results obtained are shown in Table 9.

TABLE 9

| | Catalyst components | | Results: Yield | | |
|---|---|---|---|---|---|
| Run | Zinc compound | M(SCY)₂ S | G. | Percent | [η] |
| 1 | Zn(C₃H₇)₂ | NMC | 78.9 | 81.3 | 4.8 |
| 2 | Zn(CH₃)₂ | NBC | 76.7 | 79.1 | 4.6 |
| 3 | Zn(C₄H₉)₂ | CMC | 46.8 | 48.2 | 5.1 |
| 4 | Zn(C₂H₅)₂ | CPC | 40.5 | 41.8 | 6.3 |
| 5 | Zn(C₃H₇)₂ | CBC | 49.9 | 51.4 | 4.6 |
| 6 | Zn(CH₃)₂ | NPX | 31.6 | 32.6 | 5.4 |
| 7 | Zn(C₂H₅)₂ | NBX | 37.3 | 38.5 | 4.8 |
| 8 | Zn(C₂H₅)₂ | CEX | 30.3 | 31.2 | 5.2 |
| 9 | Zn(CH₃)₂ | CPX | 25.5 | 26.3 | 5.3 |

TABLE 7

| | Catalyst components | | Monomer | | Results: Yield | | |
|---|---|---|---|---|---|---|---|
| Run | Zinc compound | M SCY (S)₂ | Monomer (g.) | Comonomer (g.) | G. | Percent | [η] |
| 1 | Zn(C₂H₅)₂ | NEC | PO (97) | | 45.3 | 46.7 | 5.1 |
| 2 | Zn(C₂H₅)₂ | NPC | PO (97) | | 23.5 | 24.2 | 4.0 |
| 3 | Zn(C₃H₇)₂ | NBC | PO (97) | | 80.0 | 82.5 | 7.9 |
| 4 | Zn(C₂H₅)₂ | CEC | PO (97) | | 39.9 | 41.1 | 5.1 |
| 5 | Zn(C₄H₉)₂ | CBC | PO (97) | AGE (6.2) | 60.5 | 58.6 | 7.4 |
| 6 | Zn(C₂H₅)₂ | NMX | PO (97) | | 12.2 | 12.6 | |
| 7 | Zn(C₂H₅)₂ | NEX | PO (97) | | 15.3 | 15.8 | 2.2 |
| 8 | Zn(C₃H₇)₂ | NPX | PO (97) | | 16.4 | 16.9 | 2.6 |
| 9 | Zn(C₄H₉)₂ | NBX | PO (97) | | 20.4 | 21.0 | 3.0 |
| 10 | Zn(C₂H₅)₂ | CMX | PO (97) | | 10.2 | 10.5 | |
| 11 | Zn(C₃H₇)₂ | CMX | PO (97) | | 12.2 | 12.6 | |
| 12 | Zn(C₂H₅)₂ | CPX | PO (97) | AGE (6.2) | 14.0 | 13.6 | 2.9 |
| 13 | Zn(C₄H₉)₂ | CPX | PO (97) | | 14.5 | 14.9 | 3.3 |
| 14 | Zn(C₄H₉)₂ | CPX | AGE (98) | | 9.8 | 10.1 | |
| 15 | Zn(C₂H₅)₂ | CBX | PO (97) | | 19.3 | 19.9 | 4.2 |

We claim:

1. In a process for polymerizing a three-membered heterocyclic compound wherein the ring-opening polymerization of a three-membered heterocyclic compound of the formula $$R-CH\underset{Q}{-\!\!-\!\!-}CH-R'$$

wherein R is a member selected from the group consisting of hydrogen and an alkyl group of up to eight carbon atoms, $R^1$ is a member selected from the group consisting of hydrogen, a hydrocarbon group of up to eight carbon atoms, alkenyloxymethyl and alkenylcarbonyloxymethyl, which R and $R^1$ may be connected to form an alkylene group, and Q is a member selected from the group consisting of oxygen and sulfur, is carried out in the presence of a catalyst, the improvement which comprises using as said catalyst one consisting of a. a heavy metal organic compound of the formula $$M(S-\underset{\underset{S}{\|}}{C}-Y)_2$$

wherein M is a member selected from the group consisting of nickel and cobalt, and Y is a member selected from the group consisting of $$-N\diagup^{R^2}_{R_3}$$

and $OR^2$ wherein $R^2$ and $R^3$ are each a monovalent hydrocarbon group of up to eight carbon atoms; and b. a dialkyl zinc.

2. The process of claim 1 wherein said dialkyl zinc compound is a compound of the formula $R_2^4Zn$ wherein $R^4$ is an alkyl group of not more than four carbon atoms.

3. The process of claim 1 wherein said catalyst is a combination of a nickel dialkyl dithiocarbamate and a dialkyl zinc.

4. The process of claim 1 wherein said catalyst is a combination of a nickel alkylxanthate and a dialkyl zinc.

5. The process of claim 1 wherein said three-membered heterocyclic compound is propylene oxide.

6. The process of claim 1 wherein said three-membered heterocyclic compound is a combination of propylene oxide and allylglycidyl ether.

7. The process of claim 1 wherein said heavy metal pound is present in a proportion of 0.1 to 10 mols per 1 mol of said dialkyl zinc compound.

8. The process of claim 1 wherein said polymerization reaction is carried out at a temperature ranging between −50° and 150° C.

* * * * *